US009389623B2

(12) United States Patent
Hu et al.

(10) Patent No.: US 9,389,623 B2
(45) Date of Patent: Jul. 12, 2016

(54) VOLTAGE CONVERTING DEVICE AND ELECTRONIC SYSTEM THEREOF

(71) Applicant: NOVATEK Microelectronics Corp., Hsin-Chu (TW)

(72) Inventors: Min-Hung Hu, Hsinchu (TW); Pin-Han Su, Taichung (TW); Chen-Tsung Wu, Kaohsiung (TW); Chiu-Huang Huang, Hsinchu County (TW); Chun-Wei Huang, Hsinchu County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 139 days.

(21) Appl. No.: 14/135,583

(22) Filed: Dec. 20, 2013

(65) Prior Publication Data

US 2015/0042297 A1 Feb. 12, 2015

(30) Foreign Application Priority Data

Aug. 9, 2013 (TW) ............................. 102128710 A

(51) Int. Cl.
*H02M 1/00* (2007.01)
*G05F 1/56* (2006.01)

(52) U.S. Cl.
CPC ........................................ *G05F 1/56* (2013.01)

(58) Field of Classification Search
CPC ........................................................ H02M 1/00
See application file for complete search history.

(56) References Cited

U.S. PATENT DOCUMENTS

| | | | | |
|---|---|---|---|---|
| 6,600,302 | B2 | 7/2003 | Ghozeil | |
| 7,342,449 | B2 * | 3/2008 | Ishii | H03F 3/45179 330/253 |
| 7,573,302 | B2 * | 8/2009 | Nakamura | H03F 3/4521 327/359 |
| 7,898,330 | B2 * | 3/2011 | Eschauzier | H03F 3/45192 330/255 |
| 7,944,252 | B1 * | 5/2011 | Bhakta | H03F 3/45183 327/108 |

FOREIGN PATENT DOCUMENTS

| | | |
|---|---|---|
| EP | 2 372 485 A1 | 10/2011 |
| TW | 200912587 | 3/2009 |
| WO | 2012082189 A1 | 6/2012 |

* cited by examiner

*Primary Examiner* — Emily P Pham
(74) *Attorney, Agent, or Firm* — Winston Hsu; Scott Margo

(57) ABSTRACT

A voltage converting device with a self-reference feature for an electronic system includes a differential current generating module, implemented in a Complementary metal-oxide-semiconductor (CMOS) processing for generating a differential current pair according to a converting voltage; and a voltage converting module, coupled to the differential current generating module, a first supply voltage and a second supply voltage of the electronic system for generating the converting voltage according to the differential current pair, the first supply voltage and the second supply voltage.

12 Claims, 6 Drawing Sheets

VOLTAGE CONVERTING DEVICE AND ELECTRONIC SYSTEM THEREOF

BACKGROUND OF THE INVENTION

1. Field of the Invention

The present invention relates to a voltage converting device and electronic system thereof, and more particularly, to a voltage converting device having a self-reference feature and realized in a Complementary metal-oxide-semiconductor (CMOS) process and electronic system thereof.

2. Description of the Prior Art

In an integrated circuit, a voltage regulator is a negative feedback circuit for generating an accurate and stable voltage. The voltage outputted by the voltage regulator is utilized as a reference voltage or a supply voltage of other circuits in the integrate circuit, generally. According to different voltage requirements and different features of components of the integrated circuit, the integrated circuit needs multiple voltage regulators to generate different supply voltages.

Please refer to FIG. 1, which is a schematic diagram of a conventional electronic system 10. The electronic system 10 may be an integrated circuit and comprises a supply voltage generating unit 100, a positive voltage circuit 102, a voltage range converting circuit 104 and a negative voltage circuit 106. The electronic system 10 utilizes the positive voltage circuit 102 operated between a positive supply voltage VDDP1 and the ground voltage GND and the negative voltage circuit 106 operated between the ground voltage GND and a negative supply voltage VDDN1 to generate a positive output signal VOUTP and a negative output signal VOUTN corresponding to the positive output signal VOUTP, respectively. Since an electronic component is damaged when the voltage across the electronic component exceeds a breakdown voltage of the electronic component, the electronic system 10 needs to use the voltage range converting circuit 104 as a buffer, for performing conversions of voltages and signals. The voltage range converting circuit 104 operates between a positive supply voltage VDDP2 and a negative supply voltage VDDN2, wherein the positive supply voltage VDDP1 is greater than the positive supply voltage VDDP2 and the negative supply voltage VDDN1 is smaller than the negative supply voltage VDDN2. In other words, the operational voltage range of the voltage range converting circuit 104 crosses positive and negative voltage range and overlaps the operational voltage ranges of the positive voltage circuit 102 and the negative voltage circuit 106.

Generally, the electronic system 10 only has an external system voltage VDDE as the power source. The electronic system 10 needs to use the supply voltage generating unit 100 for generating the supply voltages required by the positive voltage circuit 102, the voltage range converting circuit 104 and the negative voltage circuit 106. Thus, the supply voltage generating unit 100 needs at least four voltage regulators to generate the positive supply voltages VDDP1, VDDP2 and the negative supply voltages VDDN1, VDDN2. When the number of the functions of the electronic systems 10 increases, the number of the voltage regulators needed by the electronic system 10 increases. In other words, the electronic system 10 needs more voltage regulators to provide required supply voltages. However, the voltage regulator needs external inductors or external capacitors, generally, to provide a stable and accurate supply voltage. The manufacture cost of the electronic system 10 significantly increases if the number of voltage regulators arises. Moreover, at the moment the external system voltage VDDE turns on the electronic system 10, time differences are generated between the times of each supply voltage (e.g. the positive supply voltage VDDP1, VDDP2 and the negative supply voltage VDDN1, VDDN2) are generated. The time differences may cause latch-up in the electronic system 10.

On the other hand, since the supply voltages of the electronic system 10 are multiples of the external system voltage VDDE (e.g. the positive supply voltage VDDP1 may be a product of the external system voltage VDDE and 1.5, and the positive supply voltage VDDP2 may be half of the external system voltage VDDE), generally, the supply voltages of the electronic system 10 vary with the external system voltage VDDE, resulting in the supply voltages deviating from the original design values. For example, when the external system voltage VDDE is provided by a battery, the external system voltage VDDE varies with the charge storage level of the battery. The electronic system 10 needs a reference circuit to provide a reference voltage which does not vary with the external system voltage VDDE for stabilizing the supply voltages at the original design values via the feedback mechanism.

Generally, the reference circuit for providing stable reference voltage can be realized by a bandgap circuit consisting of bipolar junction transistors (BJT) realized in CMOS process or CMOS devices. The bandgap circuit realized by the BJT is not sensitive to the process variation, but the BJT of the CMOS process easily encounters latch-up when the power source turns on. Moreover, the component features of the BJT of the CMOS process also cause limitations when designing integrated circuit. Although the bandgap circuit can replace the BJT by the metal-oxide-semiconductor field-effect transistor (MOSFET) operating in sub-threshold zone, the temperature coefficient of the MOSFET operating in sub-threshold zone is easily affected by the process variation, resulting the reference voltage deviates from the design.

Besides, the bandgap circuit only generates a constant reference voltage without the ability of driving loadings. In such a condition, the reference voltage generated by the bandgap circuit needs additional voltage regulators for generating the reference voltages in different voltage levels and having the ability of driving loadings. The manufacturing cost of the electronic system 10 is increased and the design of the electronic system 10 therefore becomes complicated. Thus, how to simplify the circuits for generating the supply voltages in the electronic system becomes an important issue in the industry.

SUMMARY OF THE INVENTION

In order to solve the above problems, the present invention provides a voltage converting device having a self-reference feature and capable of generating a supply voltage equipped with the ability of driving loading and not varied with temperature.

The present invention discloses a voltage converting device with a self-reference feature for an electronic system. The voltage converting device comprises a differential current generating module, implemented in a Complementary metal-oxide-semiconductor (CMOS) processing for generating a differential current pair according to a converting voltage; and a voltage converting module, coupled to the differential current generating module, a first supply voltage and a second supply voltage of the electronic system for generating the converting voltage according to the differential current pair, the first supply voltage and the second supply voltage.

The present invention further discloses an electronic system. The electronic system comprises a supply voltage converting module, for generating a first supply voltage and a second supply voltage; at least one voltage converting device with a self-reference feature for an electronic system for generating at least one converting voltage, wherein each voltage converting device comprises: a differential current generating module, implemented in a Complementary metal-oxide-semiconductor (CMOS) processing for generating a differential current pair according to a converting voltage; and a voltage converting module, coupled to the differential current generating module, a first supply voltage and a second supply voltage of the electronic system for generating the converting voltage according to the differential current pair, the first supply voltage and the second supply voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
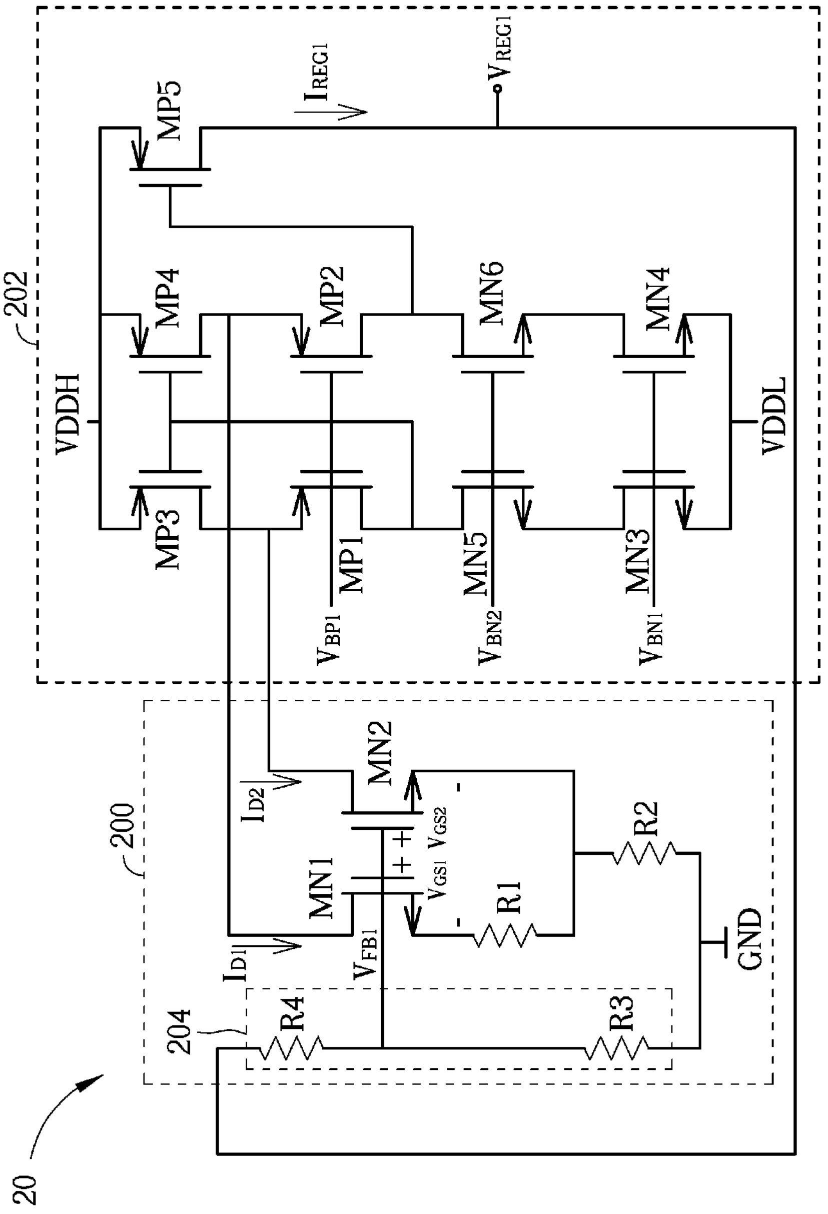
FIG. 2 is a schematic diagram of a voltage converting device according to an embodiment of the present invention.

Please refer to FIG. 2, which is a schematic diagram of a voltage converting device 20 according to an embodiment of the present invention. The voltage converting device 20 has a self-reference feature and is utilized in an electronic system for generating a supply voltage of other circuits in the electronic system according to supply voltages provided by the electronic system. As shown in FIG. 2, the voltage converting device 20 comprises a differential current generating module 200 and a voltage converting module 202. The differential current generating module 200 is utilized for generating corresponded differential currents $I_{D1}$ and $I_{D2}$ according to a converting voltage $V_{REG1}$. The voltage converting module 202 is coupled to the differential current generating module 200 and supply voltages VDDH and VDDL, for generating a converting voltage $V_{REG1}$ according to the differential currents $I_{D1}$ and $I_{D2}$ and the supply voltages VDDH and VDDL. Noticeably, since the voltage converting module 202 is equipped with the ability of driving loading, the converting voltage $V_{REG1}$ does not need additional voltage regulators for being the supply voltage of the rest of the circuits in the electronic system. Via the voltage converting device 20, the number of voltage regulators required by the electronic system can be significantly decreased and the manufacturing cost of the electronic system can be therefore reduced.

The differential current generating module 200 comprises a feedback voltage generating unit 204, transistors MN1 and MN2 and resistors R1 and R2. The feedback voltage generating unit 204 comprises resistors R3 and R4, for generating a feedback voltage $V_{FB1}$ according to a converting voltage $V_{REG1}$ and a ratio between the resistors R3 and R4. The transistors MN1 and MN2 are NMOS and form a differential pair for generating the differential currents $I_{D1}$ and $I_{D2}$. The ratio between the aspect ratios of the transistor MN1 and MN2 is $K_1$ and the transistors MN1 and MN2 operate in the sub-threshold zone. The relationships between the transistors MN1 and MN2 and the resistors R1 and R2 are described as the following. The gates of the transistors MN1 and MN2 are coupled to the feedback voltage $V_{FB1}$. Two ends of the resistor R1 are coupled to the sources of the transistors MN1 and MN2, respectively, and two ends of the resistor R2 are coupled to the source of the transistors MN2 and the ground GND, respectively. Noticeably, the ends of the resistors R2 and R4 coupled to the ground GND is not limited to be coupled to the ground GND, and can be coupled to other voltages between the supply voltages VDDH and VDDL. Via the feedback path realized by the differential current generating module 200 and voltage converting module 202, the differential current $I_{D1}$ equals the differential current $I_{D2}$ when the voltage converting device 20 enters the steady state. Thus, the feedback voltage $V_{FB1}$ can be expressed as:

$$V_{FB1}=V_{GS2}+2\times I_{D1}\times R2 \tag{1}$$

$V_{GS2}$ is the voltage difference between the gate and the source of the transistor MN2. Via calculating the current passing through the resistor R1 (i.e. $I_{D1}$), the formula (1) is modified to be:

$$V_{FB1} = V_{GS2} + 2\times\frac{V_{GS2}-V_{GS1}}{R1}\times R2 \tag{2}$$

The $V_{GS1}$ is the voltage difference between the gate and the source of the transistor MN1. Since the transistors MN1 and MN2 operate in the sub-threshold zone and the ratio between the resistances of the resistors R2 and R1 is assumed to be $L_1/2$ (i.e.

$$R2 = \frac{L_1}{2}\times R1),$$

the formula (2) is modified to be:

$$V_{FB1}=V_{GS2}+V_T\times L_1\times\ln(K_1) \tag{3}$$

$V_T$ is the thermal voltage of the transistors MN1 and MN2. Since the voltage $V_{GS2}$ is inversely proportional to the temperature (i.e. having a negative temperature coefficient) and the thermal voltage $V_T$ is proportional to the temperature (i.e. having a positive temperature coefficient), the feedback voltage $V_{FB1}$ has the feature of not varying with the temperature. According to the ratio between the feedback voltage $V_{FB1}$ and the converting voltage $V_{REG1}$, the converting voltage $V_{REG1}$ can be expressed as:

$$V_{REG1} = \frac{R3+R4}{R3}(V_{GS2}+V_T\times L_1\times\ln(K_1)) \tag{4}$$

As a result, the differential current generating module 200 does not require the BJT for generating the converting voltage $V_{REG1}$ which does not vary with temperature. In other words, the differential current generating module 200 can be realized by CMOS and not limited by the component characteristics of the BJT formed in the CMOS process. According to the formula (4), the converting voltage $V_{REG1}$ is defined when generating the differential currents $I_{D1}$ and $I_{D2}$. That is, the voltage converting device 20 can easily adjust the converting voltage $V_{REG1}$ via changing the ratios between the resistors R1 and R2 (i.e. $L_1$), the resistors R3 and R4 and the aspect ratios of the transistors MN1 and MN2 (i.e. $K_1$).

Next, the voltage converting module 202 generates the converting voltage $V_{REG1}$ according to the differential currents $I_{D1}$ and $I_{D2}$ and the supply voltages VDDH and VDDL. The supply voltages VDDH and VDDL may be the maximum voltage and the minimum voltage in the electronic system, respectively, and are not limited herein. In this embodiment, the voltage converting module 202 comprises transistors MP1-MP5 and MN3-MN6. The transistors MP1-MP4 and MN3-MN6 form a cascode current mirror to generate an appropriate voltage to the gate of the transistor MP5, for making the transistor MP5 generate the converting voltage $V_{REG1}$. The operational methods of the cascode current mirror should be well-known to those with ordinary skilled in the art, and are not narrated herein for brevity. Via the feedback path, the converting voltage $V_{REG1}$ does not vary with the current $I_{REG1}$ used for driving the post-stage loading. In other words, the current $I_{REG1}$ passing through the transistor MP5 can be adjusted according to the differential current $I_{D1}$ and $I_{D2}$ for driving the loadings of post-stages. Via the feature of the self-reference, the voltage converting device 20 only needs the supply voltages VDDH and VDDL provided by the electronic system to generate the converting voltage $V_{REG1}$, which does not vary with temperature, as the supply voltage of other circuits in the electronic system.

Figure 3:
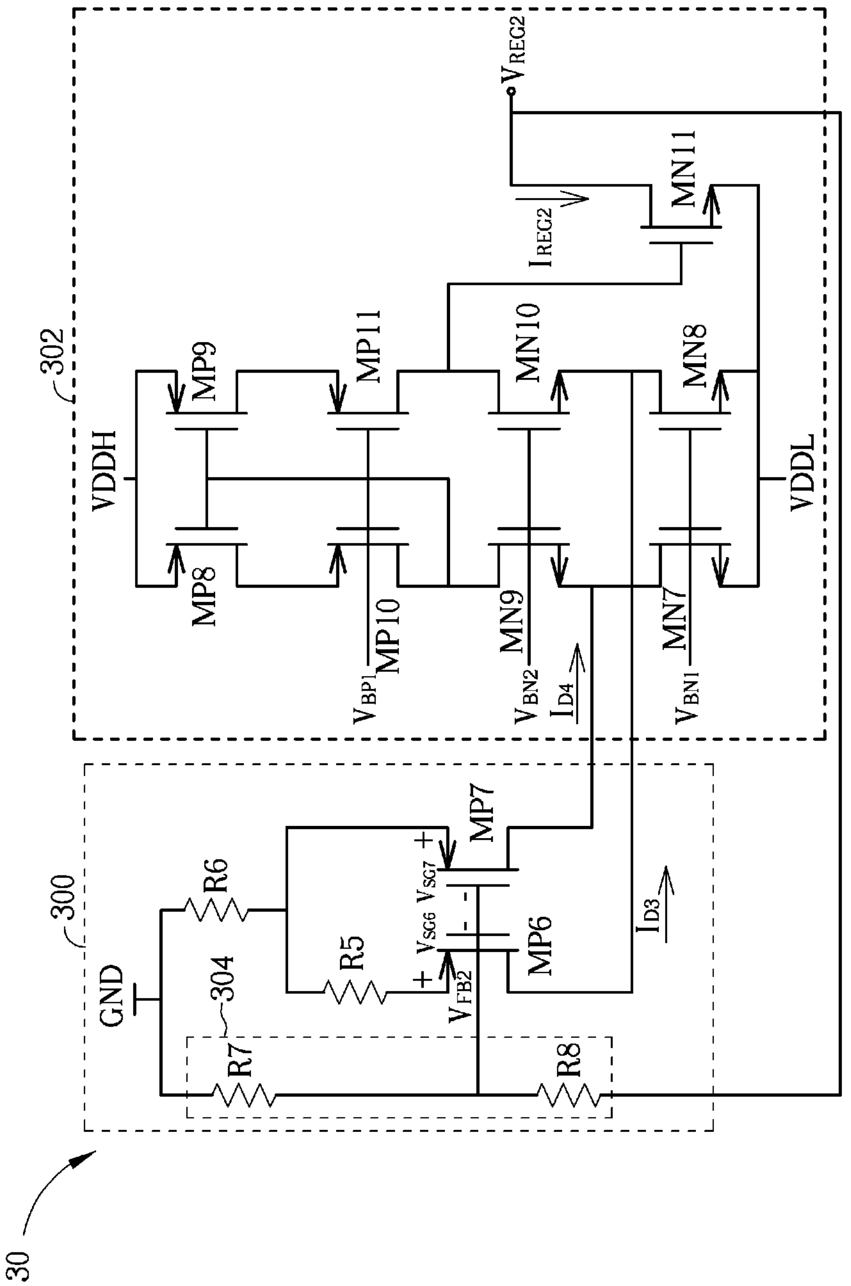
FIG. 3 is a schematic diagram of another voltage converting device according to an embodiment of the present invention.

Please refer to FIG. 3, which is a schematic diagram of a voltage converting device 30 according to an embodiment of the present invention. The voltage converting device 30 is another implementation method of the voltage converting device 20, thus the structure of the voltage converting device 30 is similar to that of the voltage converting device 20. As shown in FIG. 3, the voltage converting device 30 comprises a differential current generating module 300 and voltage converting module 302. The differential current generating module 300 comprises a feedback voltage generating unit 304, transistors MP6 and MP7 and resistors R5 and R6. The feedback voltage generating unit 304 comprises resistors R7 and R8, for generating a feedback voltage $V_{FB2}$ according to a converting voltage $V_{REG2}$ and a ratio between the resistors R7 and R8. The transistors MP6 and MP7 form a differential pair, for generating the differential currents $I_{D3}$ and $I_{D4}$. The ratio between the aspect ratios of the transistor MP6 and MP7 is $K_2$ and the transistors MP6 and MP7 operate in the sub-threshold zone. The relationships between the transistors MP6 and MP7 and the resistors R5 and R6 are described as the following. The gates of the transistors MP6 and MP7 are coupled to the feedback voltage $V_{FB2}$. Two ends of the resistor R5 are coupled to the sources of the transistors MP6 and MP7, respectively, and two ends of the resistor R6 are coupled to the source of the transistors MP7 and the ground GND, respectively. Noticeably, the ends of the resistors R6 and R8 coupled to the ground GND is not limited to be coupled to the ground GND, and can be coupled to other voltages between the supply voltages VDDH and VDDL. Via the feedback path realized by the differential current generating module 300 and voltage converting module 302, the differential current $I_{D3}$ equals the differential current $I_{D4}$ when the voltage converting device 30 enters the steady state. Thus, the feedback voltage $V_{FB2}$ can be expressed as:

$$V_{FB2}=-(V_{SG7}+2\times I_{D3}\times R6) \quad (5)$$

$V_{SG7}$ is the voltage difference between the source and the gate of the transistor MP7. Via calculating the current passing through the resistor R5 (i.e. $I_{D3}$), the formula (5) is modified to be:

$$V_{FB2} = -\left(V_{SG7} + 2\times\frac{V_{SG7}-V_{SG6}}{R5}\times R6\right) \quad (6)$$

$V_{SG6}$ is the voltage difference between the source and the gate of the transistor MP6. Since the transistors MP6 and MP7 operate in the sub-threshold zone and the ratio between the resistances of the resistors R5 and R6 is assumed to be $L_2/2$ (i.e.

$$R6 = \frac{L_2}{2}\times R5),$$

the formula (6) is modified to be:

$$V_{FB2}=-(V_{SG7}+V_T\times L_2\times\ln(K_2)) \quad (7)$$

$V_T$ is the thermal voltage of the transistors MP6 and MP7. Since the voltage $V_{SG7}$ is inversely proportional to the temperature (i.e. having a negative temperature coefficient) and the thermal voltage $V_T$ is proportional to the temperature (i.e. having a positive temperature coefficient), the feedback voltage $V_{FB2}$ has the feature of not varying with temperature. According to a ratio between the feedback voltage $V_{FB2}$ and the converting voltage $V_{REG2}$, the converting voltage $V_{REG2}$ can be expressed as:

$$V_{REG2} = -\left[\frac{R7+R8}{R7}(V_{SG7}+V_T\times L_2\times\ln(K_2))\right] \quad (8)$$

Accordingly, the differential current generating 300 module does not require the BJT for generating the converting voltage $V_{REG2}$ which does not vary with temperature. In other words, the differential current generating module 300 can be realized by CMOS and not limited by the component characteristics of the BJT formed in the CMOS process. According to the formula (8), the converting voltage $V_{REG2}$ is defined when generating the differential currents $I_{D3}$ and $I_{D4}$. That is, the voltage converting device 30 can easily adjust the converting voltage $V_{REG2}$ via changing the ratios between the resistors R5 and R6 (i.e. $L_2$), the resistors R7 and R8 and the aspect ratios of the transistors MP5 and MP6 (i.e. $K_2$).

Next, the voltage converting module 302 generates the converting voltage $V_{REG2}$ according to the differential currents $I_{D3}$ and $I_{D4}$ and the supply voltages VDDH and VDDL. In this embodiment, the voltage converting module 302 comprises transistors MP8-MP11 and MN7-MN11. The transistors MP8-MP11 and MN8-MN10 form a cascode current mirror to generate an appropriate voltage to the gate of the transistor MN11, for making the transistor MN11 generate the converting voltage $V_{REG2}$. Via the feedback path, the converting voltage $V_{REG2}$ does not vary with the current $I_{REG2}$ used for driving the post-stage loading. In other words, the current $I_{REG2}$ passing through the transistor MN11 can be adjusted according to the differential current $I_{D3}$ and $I_{D4}$ for driving the loadings of the post-stages. Comparing to the voltage converting device 20, the direction of the current $I_{REG2}$ generated by the voltage converting device 30 is different from that of the current $I_{REG1}$ generated by the voltage converting device 20. Via the feature of self-reference, the voltage converting device 30 only needs the supply voltages VDDH and VDDL provided by the electronic system for generating the converting voltage $V_{REG2}$, which does not vary with temperature, as the supply voltage of other circuits in the electronic system.

Figure 4:
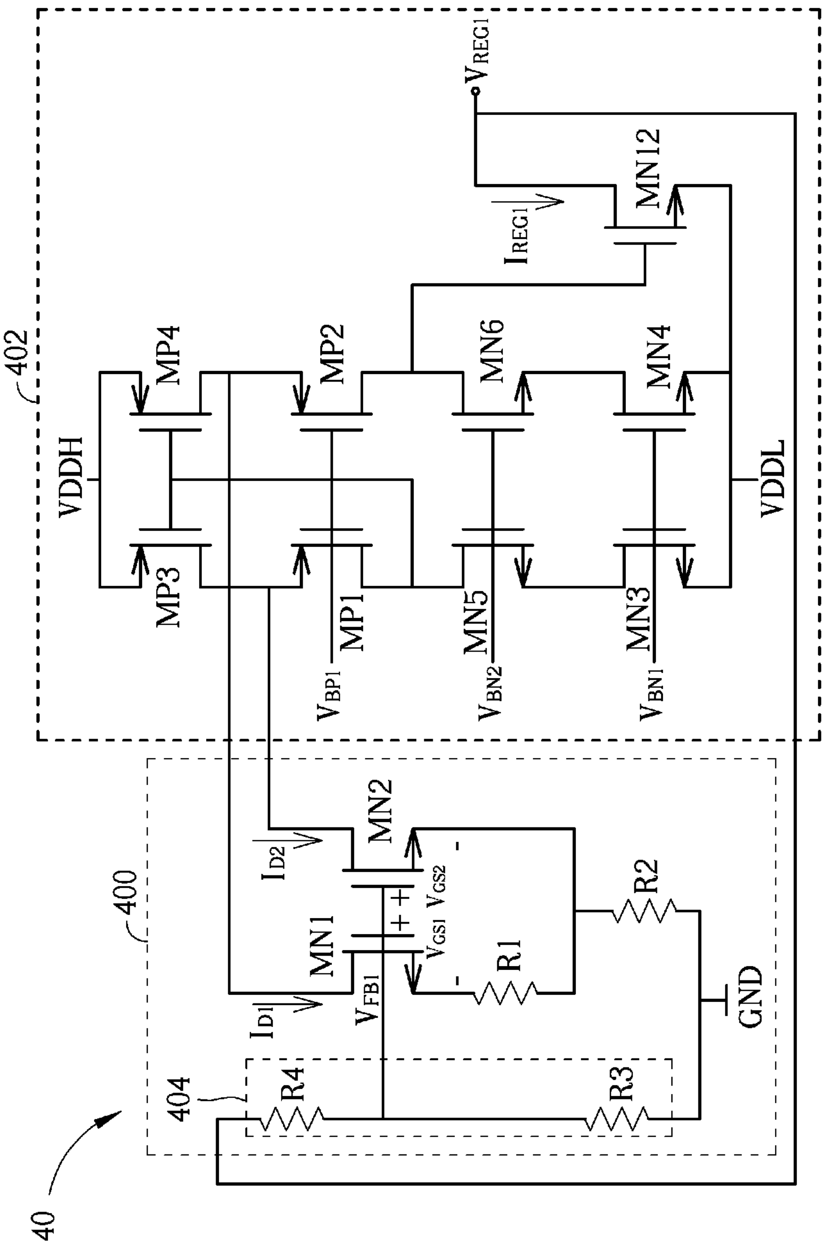
FIG. 4 is a schematic diagram of another realization method of the voltage converting device shown in FIG. 2.

Noticeably, the voltage converting devices of the above embodiments generate the converting voltage having driving ability and not varying with temperature via the feature of self-reference. According to different applications, those with ordinary skill in the art may observe appropriate alternations and modifications. For example, please refer to FIG. 4 and FIG. 5, which are schematic diagrams of other realization methods of the voltage converting device 20 shown in FIG. 2 and the voltage converting device 30 shown in FIG. 3, respectively. As shown in FIG. 4, the voltage converting device 40 comprises a differential current generating module 400 and a voltage converting module 402. The structures of the differential current converting module 400 and the voltage converting module 402 are similar to those of the differential current generating module 200 and the voltage converting module 202 in the voltage converting device 20, thus the components and signal with the same functions use the same symbols. Different from the voltage converting device 20, the voltage converting module 402 generates the converting voltage $V_{REG1}$ via the transistor MN12 and the direction of the current IREG1 is changed, therefore, for providing the ability of driving loading in another direction. The details of the operations of the voltage converting device 40 can be referred to in the above, and are not described herein for brevity.

Figure 5:
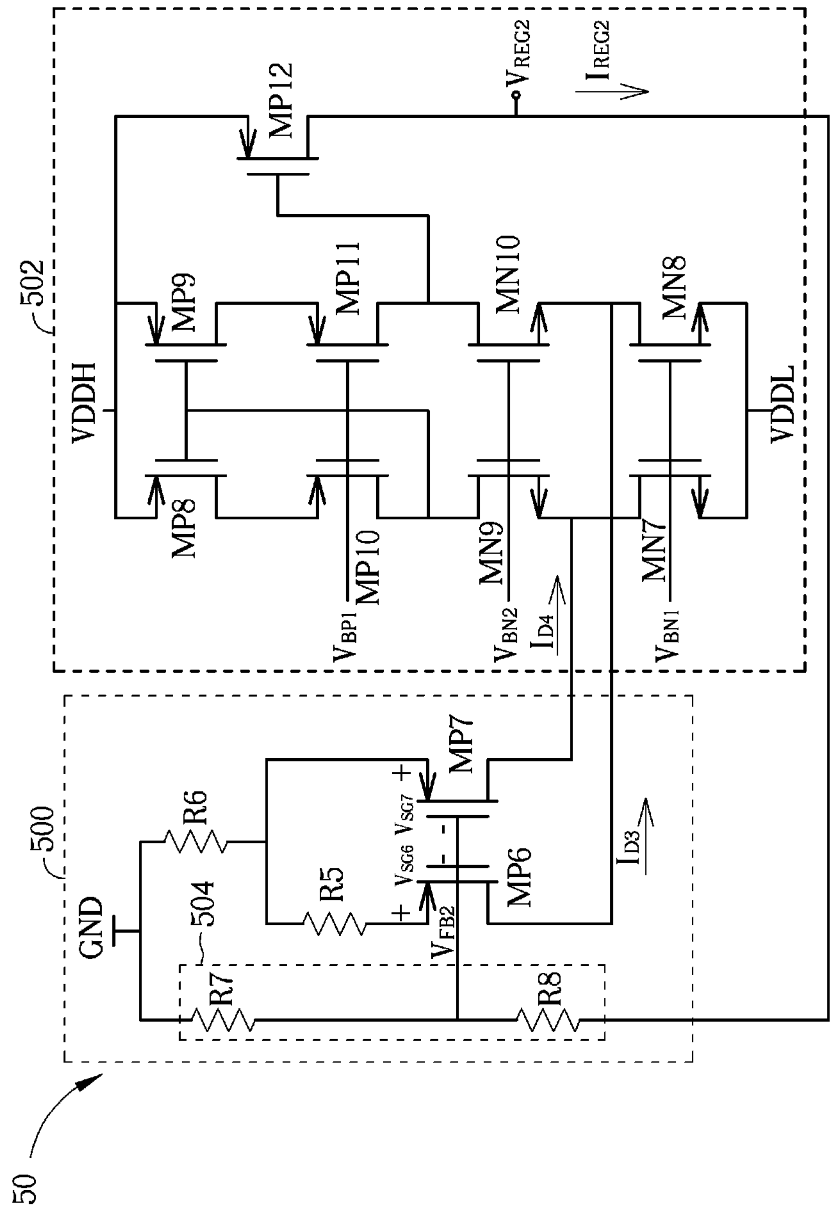
FIG. 5 is a schematic diagram of another realization method of the voltage converting device shown in FIG. 3.

Please refer to FIG. 5, the voltage converting device 50 comprises differential current converting module 500 and voltage converting module 502. The structures of the differential current converting module 500 and the voltage converting module 502 are similar to those of the differential current generating module 300 and the voltage converting module 302 in the voltage converting device 30, thus the components and signal with the same functions use the same symbols. Different from the voltage converting device 30, the voltage converting module 502 generates the converting voltage $V_{REG2}$ via the transistor MP12 and the direction of the current $I_{REG2}$ is changed, therefore, for providing the ability of driving loading in another direction. The details of the operations of the voltage converting device 50 can be referred to in the above, and are not described herein for brevity.

Figure 1:
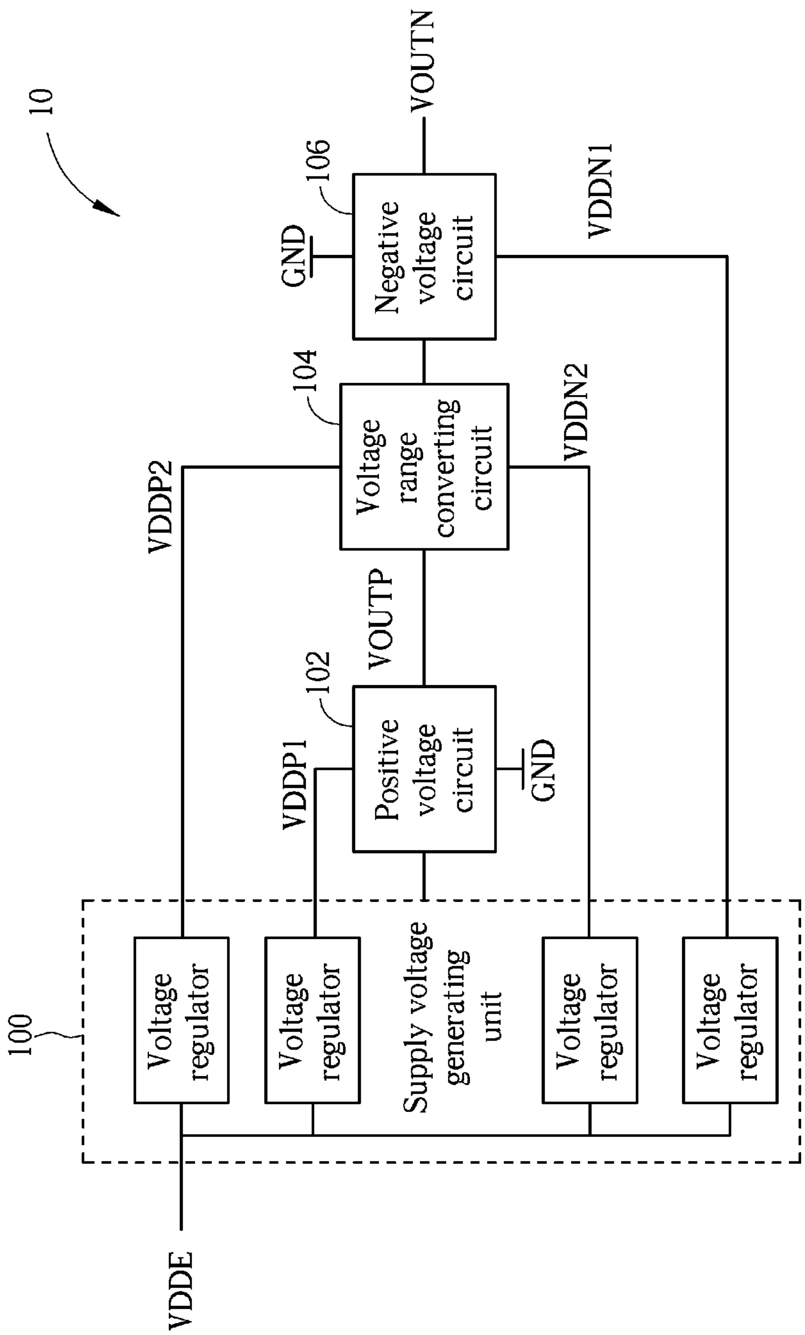
FIG. 1 PRIOR ART
FIG. 1 is a schematic diagram of a conventional electronic system.
Figure 6:
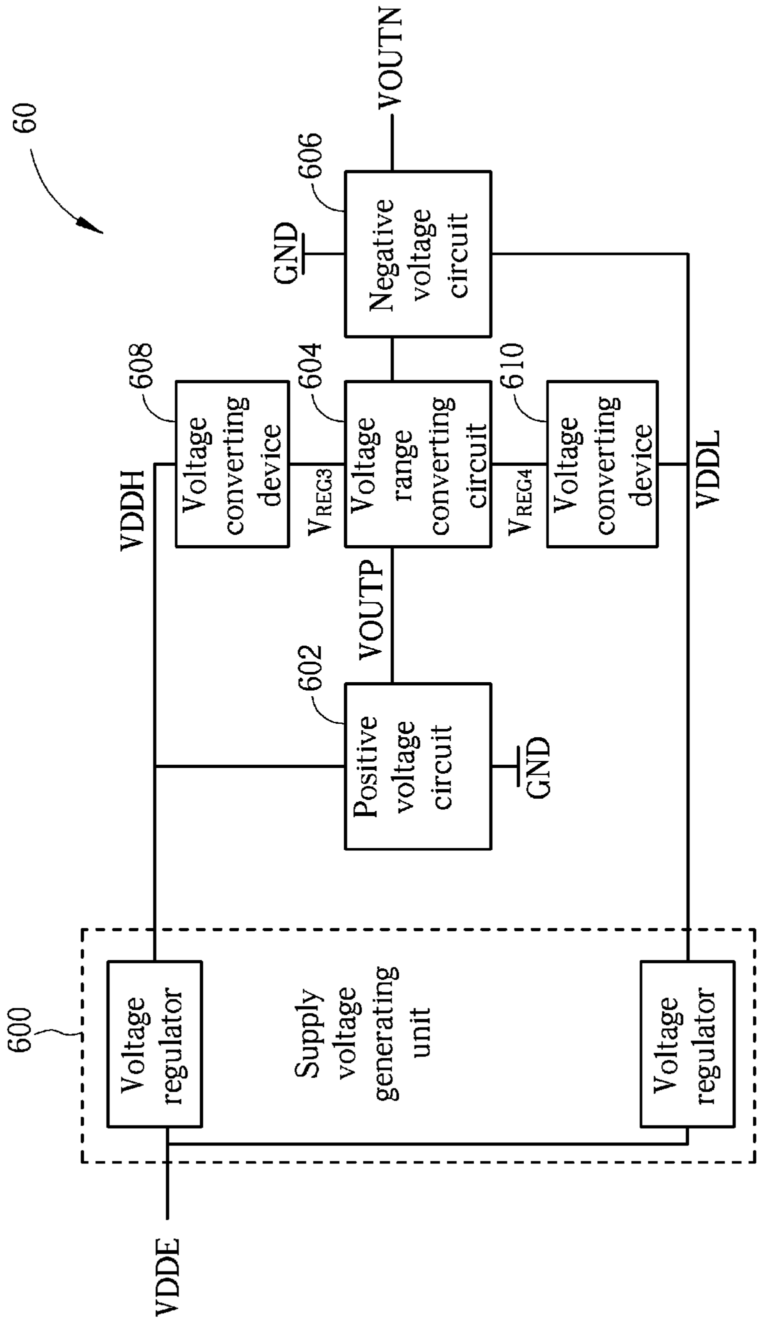
FIG. 6 is a schematic diagram of an electronic system according to an embodiment of the present invention.

Please refer to FIG. 6, which is schematic diagram of an electronic system 60 according to an embodiment of the present invention. The electronic system 60 may be an integrated circuit and comprises a supply voltage generating unit 600, a positive voltage circuit 602, a voltage range converting circuit 604, a negative voltage circuit 606 and voltage converting devices 608 and 610. The supply voltage generating unit 600 comprises two voltage regulators, for generating a maximum supply voltage VDDH and a minimum supply voltage VDDL, respectively. The positive voltage circuit 602 operates between the supply voltage VDDH and the ground voltage GND, for generating the positive output signal VOUTP. The voltage range converting circuit 604 operates between the converting voltage $V_{REG3}$ and $V_{REG4}$. The negative voltage circuit 606 operates between the ground voltage GND and the supply voltage VDDL, for generating the negative output signal VOUTN. The voltage converting device 608 and 610 can be one of the voltage converting devices 20, 30, 40 and 50 of the above embodiments. For example, the voltage converting device 608 can be the voltage converting device 20 and the voltage converting device 610 can be the voltage converting device 30. In such a condition, the supply voltages of the voltage range converting circuit 604 can be provided by the voltage converting device 608 and 610, respectively. Comparing to the electronic system 10 shown in FIG. 1, via using the voltage converting device 608 and 610 to provide the required supply voltages, the number of voltage regulators with expansive manufacturing cost in the electronic system 60 is decreased. If the electronic system 60 needs more supply voltages, the additional supply voltages can be provided by adding the voltage converting devices of the above embodiments. In other words, the electronic system 60 only needs two voltage regulators for generating the supply voltages VDDH and VDDL and the rest of supply voltages required by the electronic system 60 can be generated via the voltage converting devices of the above embodiments. The manufacturing cost of the electronic system 60 is therefore reduced. Besides, the converting voltages $V_{REG3}$ and $V_{REG4}$ are generated after the supply voltages VDDH and VDDL are generated. The latch-up caused by time differences between the times of supply voltages are generated can be avoided.

To sum up, the voltage converting devices of the above embodiments have the feature of self-reference and generate the converting voltage not varying with temperature and equipped with a driving ability according to the supply voltages of the electronic system. Accordingly, the number of voltage regulators in the electronic system can be decreased and the latch-up caused by the time differences between the times of different voltage regulators generate the supply voltages can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage converting device comprising:

a differential current generating module comprising:

a first transistor comprising a gate coupled to a feedback voltage, a source coupled to a first node, and a drain coupled to a first output end, for generating a first differential current according to the feedback voltage, wherein the feedback voltage is a product of a converting voltage and a ratio;

a second transistor comprising a gate coupled to the feedback voltage, a source coupled to a second note, and a drain coupled to a second output end, for generating a second differential current according to the feedback voltage;

a first resistor coupled between the first node and the second node; and a second resistor coupled between the second node and a first supply voltage; and a voltage converting module coupled to the differential current generating module, a second supply voltage and a third supply voltage for generating the converting voltage according to the first differential current, the second differential current, the second supply voltage and the third supply voltage.

2. The voltage converting device of claim 1, wherein the second supply voltage is a maximum voltage in an electronic system comprising the voltage converting device.

3. The voltage converting device of claim 1, wherein the third supply voltage is a minimum voltage in an electronic system comprising the voltage converting device.

4. The voltage converting device of claim 1, wherein the differential current generating module further comprises:

a feedback voltage generating unit for generating the feedback voltage according to the converting voltage.

5. The voltage converting device of claim 1, wherein the first supply voltage is a voltage of the ground.

6. The voltage converting device of claim 1, wherein the first transistor and the second transistor are Metal-Oxide- Semiconductor Field-Effect Transistor (MOSFET) and are operated at a sub-threshold region.

7. An electronic system, comprising:

supply voltage converting module, for generating a first supply voltage and a second supply voltage;

at least one voltage converting device for generating at least one converting voltage, wherein each voltage converting device comprising:

a differential current generating module comprising:

a first transistor comprising a gate coupled to a feedback voltage, a source coupled to a first node, and a drain coupled to a first output end, for generating a first differential current according to the feedback voltage, wherein the feedback voltage is a product of a converting voltage and a ratio;

a second transistor comprising a gate coupled to the feedback voltage, a source coupled to a second node, and a drain coupled to a second output end, for generating a second differential current according to the feedback voltage;

a first resistor coupled between the first node and the second node, and a second resistor coupled between the second node and a third supply voltage; and a voltage converting module coupled to the differential current generating module, the first supply voltage and the second supply voltage for generating the converting voltage according to the first differential current, the second differential current, the first supply voltage and the second supply voltage.

8. The electronic system of claim 7, wherein the first supply voltage is a maximum voltage of the electronic system.

9. The electronic system of claim 7, wherein the second supply voltage is a minimum voltage of the electronic system.

10. The electronic system of claim 7, wherein the differential current generating module further comprises:

a feedback voltage generating unit for generating the feedback voltage according to the converting voltage.

11. The electronic system of claim 7, wherein the third supply voltage is a voltage of the ground.

12. The electronic system of claim 7, wherein the first transistor and the second transistor are Metal-Oxide-Semiconductor Field-Effect Transistor (MOSFET) and are operated at sub-threshold region.

* * * * *